Figure 1:
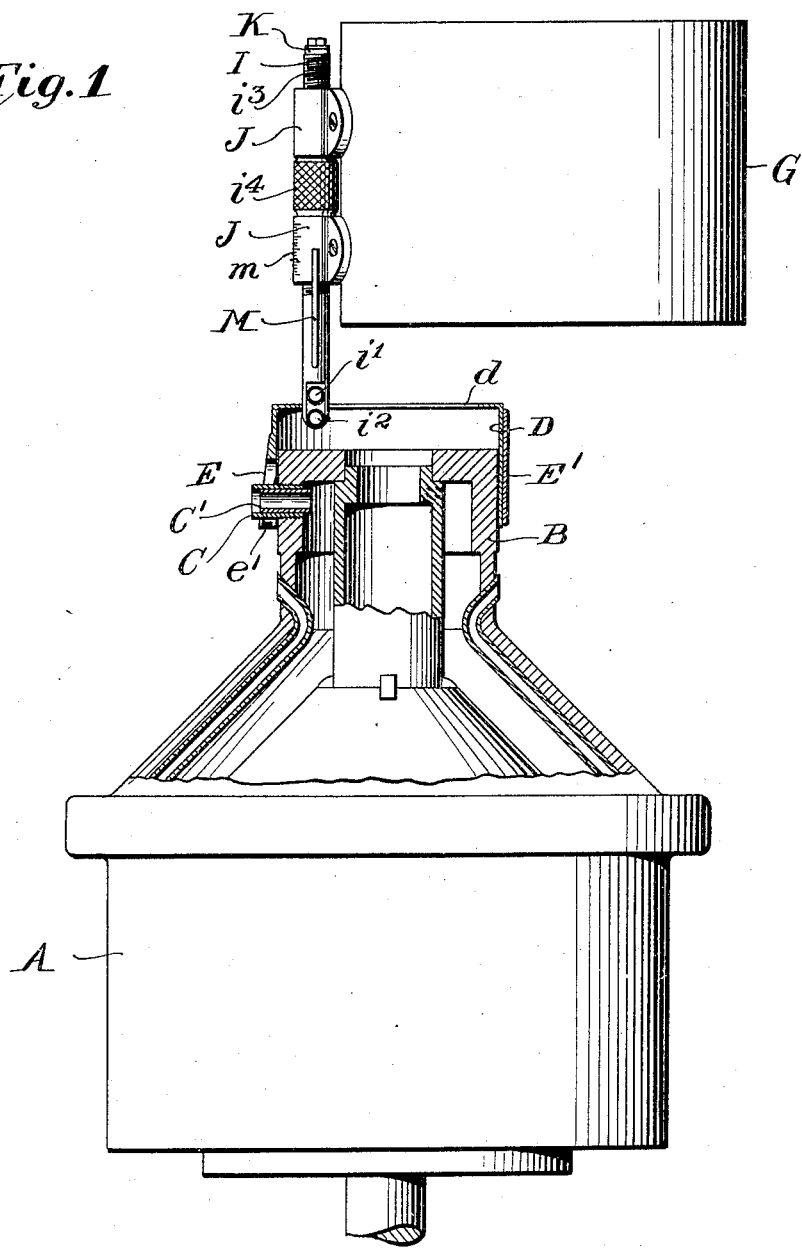

No. 775,510. PATENTED NOV. 22, 1904.
J. J. BERRIGAN.
DISCHARGE REGULATING DEVICE FOR SEPARATORS.
APPLICATION FILED JUNE 3, 1904.
NO MODEL. 2 SHEETS—SHEET 1.

No. 775,510. PATENTED NOV. 22, 1904.
J. J. BERRIGAN.
DISCHARGE REGULATING DEVICE FOR SEPARATORS.
APPLICATION FILED JUNE 3, 1904.
NO MODEL. 2 SHEETS—SHEET 2.

WITNESSES:
M. F. Ellis
M. M. Hamilton

INVENTOR
John Joseph Berrigan
BY
Harding & Harding
ATTORNEYS

No. 775,510.                                              Patented November 22, 1904.

UNITED STATES PATENT OFFICE.

JOHN JOSEPH BERRIGAN, OF ORANGE, NEW JERSEY, ASSIGNOR TO THE DE LAVAL SEPARATOR COMPANY, A CORPORATION OF NEW JERSEY.

DISCHARGE-REGULATING DEVICE FOR SEPARATORS.

SPECIFICATION forming part of Letters Patent No. 775,510, dated November 22, 1904.

Application filed June 3, 1904. Serial No. 210,970. (No model.)

*To all whom it may concern:*

Be it known that I, JOHN JOSEPH BERRIGAN, a citizen of the United States, residing at Orange, county of Essex, and State of New Jersey, have invented a new and useful Improvement in Discharge-Regulating Devices for Separators, of which the following is a full, clear, and exact description, reference being had to the accompanying drawings, which form a part of this application.

The object of my invention is to regulate and vary during the revolution of the bowl the discharge from the bowl, so that cream or milk of the desired and varied constituency may be obtained without stopping the bowl to obtain such regulation. Speaking generally, I accomplish this object by providing a discharge-tube passing through and to the interior of the bowl and loosely mounted, so as to be capable of moving inward toward the center and outward from the center, the latter movement being produced by and the former movement being against the action of centrifugal force. Preferably I provide in addition to the regular discharge-tube which is secured in the bowl a second tube loosely placed within the discharge-tube, so as to be capable of moving beyond the inner end of the regular tube, and thus project farther in the liquid-space of the bowl. The fit of the inner tube is so loose that the action of centrifugal force will force it to its most outward position. I also provide mechanism which may be operated while the bowl is rotating, which when operated will move the loosely-mounted tube inward against the centrifugal force the desired distance and hold it there and which also will limit and allow variance in the outward movement of this loosely-mounted tube. I preferably use as a part of the operating means for the movement of this inner tube a ring mounted in connection with the neck of the bowl, so as to have a floating fit thereon, made slightly heavier at one part, so that it is by centrifugal force held in rotative contact.

I have also various details of construction which enable my invention to be readily applied to bowls in use without returning them to the shop for reconstruction and make its use most practical.

I will first describe the embodiment of my invention illustrated in the accompanying drawings and then point out the invention in the claims.

Figure 2:
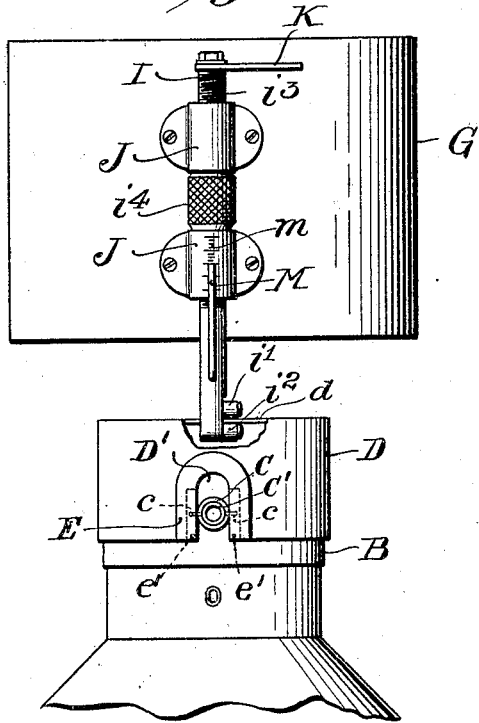
Figure 3:
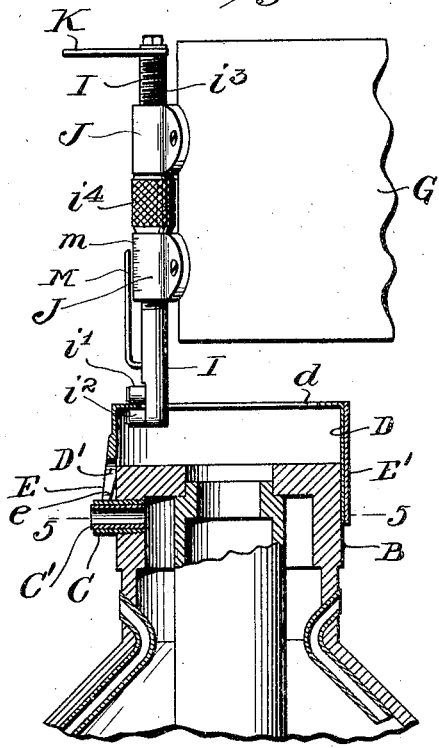
Figure 4:
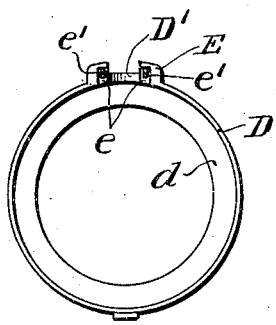
Figure 5:
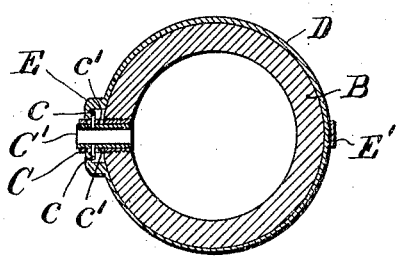

In the drawings, Figure 1 is a side elevation of the device, partly in section. Fig. 2 is a front elevation of the device. Fig. 3 is a side elevation, partly in section. Fig. 4 is a plan of detail. Fig. 5 is a section on line 5 5, Fig. 3.

A is the rotatable bowl, rotated by any well-known mechanism; B, the neck thereof. The cream-outlet, as shown, consists of the tube C, screw-threaded at its end and secured in a threaded orifice in the neck of the bowl. Within this tube C is a second tube C', fitting loosely therein and having pins $c$ projecting through slots $c'$ in the tube C. As may be seen, the tube C' can freely move longitudinally within the tube C to the limit of the slots $c'$. When in its outer position, its inner end is substantially in alinement with the inner end of tube C, and when in its inner position it projects within the bowl beyond the inner end of the tube C. The fit of the tube C' within the tube C is such that unless restrained the action of centrifugal force in the operation of the machine will force and hold the inner tube in its most outward position.

D is a ring fitting loosely around the neck of the bowl and having the flange $d$ at its upper portion. One portion of the ring is cut away at D', and secured thereto or formed therewith at this point is the projecting piece E, having the inclined inner portions $e\ e$, at the bottom of which are the pins $e'\ e'$. The tube C projects through the cut-away portion of the ring D, and the pins $c\ c$ rest against the inclined portions $e\ e$ of the piece E. The ring D is provided with the attached strip E', which is of slightly less weight than the piece E, so that in the rotation of the bowl the slight overbalancing of the ring at portion E will cause the ring to slightly bind on and rotate with the neck. In practice, by means of the piece E', I can readily adjust this balancing or overbalancing so that the proper contact of the ring and neck for operation may be obtained, and I can do this readily in the field. Indeed, to obtain the correct condition I can readily use ordinary solder for the piece E', applying a sufficient amount to obtain the desired weight. The arrangement is such that when the ring is in the position that the pins $c$ $c$ are on the upper end of incline $e$ the inner tube C' will be extended inwardly to its full extent. By lifting the ring the inclines $e$ will fall away from the pins; but the centrifugal force will cause the tube C' to move in the tube C until the pins contact with the inclines $e$. The machine is such that at the bottom the inner tube C' will move in the tube C until its inner end substantially coincides with the inner end of tube C. It may also be seen that while the bowl is in operation the pins $c$ $c$ coacting with pins $e'$ $e'$ will prevent the ring being lifted off; but when the machine is at rest if the ring be moved down face inward the tube C' to its full extent and then moved up the inner tube, being no longer under centrifugal action, will remain at its most extended position, so that when it reaches the bottom of the inclines $e$ $e$ the pins $c$ $c$ will be beyond pins $e'$ $e'$ and the ring may readily be removed. As may be seen, with this device the ring in one direction extends the inner tube beyond the outer tube a distance dependent upon the extent of movement of ring. In the other direction the ring in its movement limits the return movement of the tube under the action of centrifugal force.

I operate this ring during the rotation of the machine as follows: I is a rod having at its lower end the projecting rollers $i'$ $i^2$, the space between which is slightly greater than the thickness of the flange $d$ of the ring D. The upper portion of this rod has the thread $i^3$ cut thereon and working thereon the internally-threaded nut $i^4$. Above and below this nut $i^4$ and surrounding the rod are the bearings J, secured to the feed-cup G. Any other non-rotatable portion of the machine will answer as well as the feed-cup G to which to secure the bearings J. Near the upper end of the rod I is the projecting rod K. The position of the parts, as shown, is such that by moving the rod K the rollers $i$ and $i^2$ will be brought, respectively, above and below the flange $e$. When in this position, by turning the nut $i^4$ in one direction the rod I is elevated, and through the medium of the roller $i^2$ the ring E is elevated and the density of the cream increased, and when the nut is turned in the other direction, through the medium of roller $i'$, the ring E is depressed and the density of the cream decreased. As the ring E is rotating with the bowl, and thus rapidly, the action of rollers $i$ and $i^2$ is practically upon the whole circumference of the flange $f$ of ring E. Secured to the rod I is the pointer M, which when the rod is turned so that rollers $i'$ $i^2$ are above and below flange $d$ comes in line with scale $m$. In the vertical movement of the rod this pointer M travels along the scale, and thus the scale may be graduated, so that the extent of the movement for any given separation of cream may be determined by moving the rod until the pointer indicates on the scale the point corresponding to the position for such separation.

Having now fully described my invention, what I claim, and desire to protect by Letters Patent, is—

1. In a centrifugal separator, the combination with the rotatable bowl, of a liquid-discharge tube loosely supported and movable under the action of centrifugal force.

2. In a centrifugal separator, the combination with the rotatable bowl, of a liquid-discharge tube loosely supported and movable under the action of centrifugal force, a device adapted to limit and regulate the extent of movement of said tube while under the action of centrifugal force.

3. In a centrifugal separator, the combination with the rotatable bowl, of a liquid-discharge tube loosely supported and movable under the action of centrifugal force, a device adapted to limit and regulate the extent of movement of said tube while under the action of centrifugal force, and means to operate said device during the rotation of the bowl.

4. In a centrifugal separator, the combination, with the rotatable bowl, of a liquid-discharge tube loosely supported and movable toward and from the center of the bowl, a device adapted in its movement to force said tube toward the center.

5. In a centrifugal separator, the combination with the rotatable bowl, of a liquid-discharge tube loosely supported and movable toward and from the center of the bowl, a device adapted in its movement to force said tube toward the center, and means to operate said device during the rotation of the bowl.

6. In a centrifugal separator, the combination, with the rotatable bowl, of a liquid-discharge tube loosely supported and movable toward and from the center of the bowl, said tube being moved from the center by centrifugal force, a device adapted in its movement in one direction to limit and vary the extent of movement of the tube under the action of centrifugal force and in the other direction to move said tube toward the center against the action of centrifugal force.

7. In a centrifugal separator, the combination, with the rotatable bowl, of a liquid-discharge tube loosely supported and movable toward and from the center of the bowl, said tube being moved from the center by centrifugal force, a device adapted in its movement in one direction to limit and vary the movement of the tube under the action of centrifugal force and in the other direction to move said tube toward the center against the action of centrifugal force, and means to operate said device during the rotation of the bowl.

8. In an apparatus of the character described, a ring loosely carried by the neck of the bowl and slightly overbalanced at one portion thereof, whereby the ring in the rotation of the bowl is held in rotative contact with the neck of said bowl.

9. In an apparatus of the character described, a ring loosely carried by the neck of the bowl, having weighted material attached thereto so as to slightly overbalance one portion thereof for maintaining the ring in operative contact with the neck of the bowl.

10. In a centrifugal separator, the combination with a rotatable bowl, of a tube secured to and passing through the wall of the bowl, a second tube loosely mounted within the first tube and movable within the bowl beyond the first-named tube.

11. In a centrifugal separator, the combination, with a rotatable bowl, of a tube secured to and passing through the wall of the bowl, a second tube loosely mounted within the first tube and movable within the bowl beyond the first-named tube, said inner tube being moved to, and held in, its most outward position by the action of centrifugal force.

12. In a centrifugal separator, the combination with a rotatable bowl, of a tube secured to and passing through the wall of the bowl, a second tube loosely mounted within the first tube and movable within the bowl beyond the first-named tube, a device adapted in its movement to force said inner tube inward beyond the outer tube.

13. In a centrifugal separator, the combination, with a rotatable bowl, of a tube secured to and passing through the wall of the bowl, a second tube loosely mounted within the first tube and movable within the bowl beyond the first-named tube, a device adapted in its movement to force said inner tube inward beyond the outer tube, and means to operate said device during the rotation of the bowl.

14. In a centrifugal separator, the combination with a rotatable bowl, of a tube secured to and passing through the wall of the bowl, a second tube loosely mounted within the first tube and movable within the bowl beyond the first-named tube, said inner tube being moved to, and held in, its most outward position by the action of centrifugal force, and a device adapted in its movement in one direction to force said inner tube inward against the action of centrifugal force and in its movement in the other direction to limit and regulate the extent of movement of said tube under the action of centrifugal force.

15. In a centrifugal separator, the combination with a rotatable bowl, of a tube secured to and passing through the wall of the bowl, a second tube loosely mounted within the first tube and movable within the bowl beyond the first-named tube, and connection between said tubes, whereby the movement of the inner tube within and without the outer tube is limited.

16. In a centrifugal separator, the combination with the rotatable bowl, of a tube loosely mounted and projecting through the neck of the bowl into the interior thereof, a ring loosely mounted on the neck of the bowl so as to revolve with and be vertically movable upon said neck, an orifice in said ring into which said tube extends, a wedge projection carried by said ring, and connection between said wedge portion and the tube, whereby in the vertical movement of the ring in one direction said tube is forced inward and in the other direction its outward movement is limited.

17. In a centrifugal separator, the combination, with the rotatable bowl, of a tube loosely mounted and projecting through the neck of the bowl into the interior thereof, a ring loosely mounted on the neck of the bowl so as to revolve with and be vertically movable upon said neck, an orifice in said ring into which said tube extends, a wedge projection carried by said ring, and connection between said wedge portion and the tube, whereby in the vertical movement of the ring in one direction said tube is forced inward and in the other direction its outward movement is limited, said tube being moved outward by the action of centrifugal force.

18. In a centrifugal separator, the combination, with the rotatable bowl, of a tube loosely mounted and projecting through the neck of the bowl into the interior thereof, a ring loosely mounted on the neck of the bowl so as to revolve with and be vertically movable upon said neck, an orifice in said ring into which said tube extends, a wedge projection carried by said ring, a projection from said tube resting against said wedge projection.

19. In a centrifugal separator, the combination, with the rotatable bowl, of a tube loosely mounted and projecting through the neck of the bowl into the interior thereof, a ring loosely mounted on the neck of the bowl so as to revolve with and be vertically movable upon said neck, an orifice in said ring into which said tube extends, a wedge projection carried by said ring, a projection from said tube resting against said wedge projection, said tube being moved outward by centrifugal action.

20. In a centrifugal separator, the combination with a rotatable bowl, of a tube secured to and passing through the wall of the bowl, a second tube loosely mounted within the first tube and movable within the bowl beyond the first-named tube, a ring loosely mounted on the neck of the bowl so as to revolve with and be vertically movable upon said neck, an orifice in said ring into which said tube extends, a wedge projection carried by said ring, a pin attached to the inner tube, there being a slot in the outer tube through which said pin projects, said pin contacting with the wedge ring projection.

21. In a centrifugal separator, the combination, with a rotatable bowl, of a tube secured to and passing through the wall of the bowl, a second tube loosely mounted within the first tube and movable within the bowl beyond the first-named tube, a ring loosely mounted on the neck of the bowl so as to revolve with and be vertically movable upon said neck, an orifice in said ring into which said tube extends, a wedge projection carried by said ring, a pin attached to the inner tube, there being a slot in the outer tube through which said pin projects, said pin contacting with the wedge ring projection, said second tube being moved outward by centrifugal force.

22. In a centrifugal separator, the combination, with the rotatable bowl, of a tube loosely mounted and projecting through the neck of the bowl into the interior thereof, a ring loosely mounted on the neck of the bowl so as to revolve with and be vertically movable upon said neck, an orifice in said ring into which said tube extends, a wedge projection carried by said ring, a projection from said tube resting against said wedge projection, said tube being moved outward by centrifugal action, said wedge at one end being provided with a projection, the outer end of said wedge being beyond said projection, whereby when the bowl is rotating, the wedge projection and tube projection coact to prevent the removal of the ring but do not coact when the bowl is at rest.

23. In a centrifugal separator, the combination, with a rotatable bowl, of a tube secured to and passing through the wall of the bowl, a second tube loosely mounted within the first tube and movable within the bowl beyond the first-named tube, a ring loosely mounted on the neck of the bowl so as to revolve with and be vertically movable upon said neck, an orifice in said ring into which said tube extends, a wedge projection carried by said ring, a pin attached to the inner tube, there being a slot in the outer tube through which said pin projects, said pin contacting with the wedge ring projection, said tube being moved outward by centrifugal force, said wedge at one end being provided with a projection, the outer end of said wedge being beyond said projection, whereby when the bowl is rotating the wedge projection and tube-pin coact to prevent the removal of the ring but do not coact when the bowl is at rest.

In testimony of which invention I have hereunto set my hand, at New York city, on this 28th day of May, 1904.

JOHN JOSEPH BERRIGAN

Witnesses:
JOHN S. PAUL,
GEO. D. TALLMAN.